(12) United States Patent
Chandok et al.

(10) Patent No.: US 11,410,700 B2
(45) Date of Patent: Aug. 9, 2022

(54) VIDEO PLAYBACK BUFFER ADJUSTMENT

(71) Applicant: Apple Inc., Cupertino, CA (US)

(72) Inventors: Gurtej Singh G. Chandok, Sunnyvale, CA (US); Eric L. Chien, Sunnyvale, CA (US); Christopher M. Garrido, Santa Clara, CA (US); Ming Jin, Saratoga, CA (US); Karthick Santhanam, Campbell, CA (US); Brian T. Toombs, San Jose, CA (US); Joshua L. Hare, Sunnyvale, CA (US); David L. Biderman, Los Gatos, CA (US); Patrick Miauton, Redwood City, CA (US); Luciano M. Verger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/349,733

(22) Filed: Jun. 16, 2021

(65) Prior Publication Data
US 2021/0398563 A1   Dec. 23, 2021

Related U.S. Application Data

(60) Provisional application No. 63/041,663, filed on Jun. 19, 2020, provisional application No. 63/041,684, filed on Jun. 19, 2020.

(51) Int. Cl.
*H04N 5/783* (2006.01)
*G11B 27/00* (2006.01)

(52) U.S. Cl.
CPC .................. *G11B 27/005* (2013.01)

(58) Field of Classification Search
CPC .................. H04N 21/44004; G11B 27/005
USPC .................. 386/343, 344, 345, 346, 347
See application file for complete search history.

(56) References Cited

U.S. PATENT DOCUMENTS

| | | | |
|---|---|---|---|
| 2015/0179227 A1* | 6/2015 | Russell | H04N 21/4334 386/354 |
| 2015/0355818 A1* | 12/2015 | Corbin | H04N 21/4622 715/716 |

\* cited by examiner

*Primary Examiner* — Robert Chevalier
(74) *Attorney, Agent, or Firm* — Womble Bond Dickinson (US) LLP

(57) ABSTRACT

A video playback buffer adjustment system is disclosed. The video playback buffer has a target size, measured in units of time of content, and includes a compressed frames queue and an uncompressed frames queue. The uncompressed frames queue has a minimum threshold queue size. If the size of the uncompressed frames queue falls below the minimum threshold size, then a next encoded frame in the compressed frames queue is removed from the compressed frames queue, decoded, and enqueued in the uncompressed frames queue. If a current size of the playback queue exceeds the target size plus Δ (a hysteresis value), then a playback frame rate is increased, and a presentation time of one or more frames in the uncompressed frames queue is adjusted according to the increased playback frame rate. If the playback queue size is less than the target size minus Δ, the playback speed can be reduced.

21 Claims, 9 Drawing Sheets

VIDEO PLAYBACK BUFFER ADJUSTMENT

RELATED APPLICATIONS

This application claims priority of U.S. Provisional Patent Application No. 63/041,663 to Luciano M. Verger entitled, "REALTIME VIDEO JITTER ESTIMATION," filed Jun. 19, 2020, and claims priority of U.S. Provisional Patent Application No. 63/041,684 to Gurtej Singh G. Chandok entitled, "VIDEO PLAYBACK BUFFER ADJUSTMENT," filed Jun. 19, 2020, both of which are hereby incorporated by reference in their entirety, to the extent that they are consistent with this disclosure.

TECHNICAL FIELD

This disclosure relates to the field of video buffering and playback of content comprising video or audiovisual content.

BACKGROUND

The quality of real-time video streaming between connected devices is highly dependent on being able to reliably play frames of the video in time and without loss. Video frames being transported end-to-end can suffer from network delay variation, ranging from lower variance in a local area network (LAN) to higher variance in a wide area network (WAN), where packets traverse a plurality of different network topologies. Delay variances on video frame reception occur not only due to network transports, but additionally to sender video frame capture, conversion, and encoding processes. A video receiver must buffer video frames sufficiently to avoid stalls due to jitter from network delays and also sender device video capture, conversion, and encoding jitter.

In the prior art, two techniques are predominantly used to address network jitter. Some prior art solutions address network jitter by increasing the video buffer size. A problem with this solution is that video frames, even when compressed, can consume a substantial amount of memory. An unbounded video buffer size can cause video interruption and lost frames of video when available memory is exhausted. In addition, allocating more memory to the video buffer reduces the amount of memory available for use by other applications and processes of a computing device. Some prior art solutions reduce network jitter by selecting a lower resolution of video that uses less memory and less network bandwidth, so that more video frames can be stored in a buffer without an excessive increase in buffer memory requirements. This solution can work for streaming services wherein media content has been pre-encoded in multiple resolutions. However, in real-time video, such as in a video "chat" or teleconference, switching video encodings in real-time can put a sizable computational burden on the transmission-side encoding. Further, in both the pre-encoded and live streaming scenarios, reduced encoding resolution yields a similarly reduced user experience.

SUMMARY OF THE DESCRIPTION

Systems and methods are disclosed for providing video playback buffer adjustment in real-time, to improve a user's video experience in presence of network jitter and network latency. The video playback buffer adjustment can maintain an optimal amount of memory usage by ensuring that the size of the video playback buffer, as measured in playback time, provides a smooth playback at optimal resolution with minimal dropped video frames and minimal latency.

When a frame, e.g. a video frame, arrives from the network, it is first added to a compressed frame queue. If the number of frames in an uncompressed frame queue is below a low water mark value (e.g. 3 frames), then the received compressed frame is immediately decoded and moved to the uncompressed frame queue. If the number of frames in the uncompressed frames queue is larger than the low water mark value, the frame remains in the compressed frames queue until enough frames are removed from the compressed frames queue to drop below the low water mark, at which time the frame is decoded and moved to the uncompressed frames queue. Latency adjustment is performed on the frames in the uncompressed frames queue.

In a first aspect, a computer-implemented method of video playback buffer adjustment functionality includes configuring a playback queue of an electronic device for a playback mode, a first playback frame rate, and a target size. The playback queue includes a compressed frames queue and an uncompressed frames queue. The uncompressed frames queue has a minimum threshold size. The target size of the playback queue, and the minimum threshold size of the uncompressed frames queue, represent an amount of video frames measured in units of time. A video frame is received in an encoded format. A video encoding format can be, e.g. H.264, HEVC, MP4, 3GP, OGG, WMV, AVI, QuickTime®, and the like. If the playback queue is configured for immediate playback mode, then a received encoded frame can be decoded and enqueued in the uncompressed frames queue immediately, where it is held until it is time to display the frame. A frame may be displayed at, e.g., a vertical synchronization signal ("vsync") of the display, or other time when the decoded frame is displayed to a display device of a user. In an embodiment, if the playback queue is not configured for immediate playback mode, then the received encoded video frame can be enqueued in the compressed frames queue. In an embodiment, if a current size of the uncompressed frames queue is less than the minimum threshold size (a "low water mark") for the uncompressed frames queue, then an encoded frame can be dequeued from the compressed frames queue, decoded, and enqueued in the uncompressed frames queue. In an embodiment, after a frame is displayed to the user, then a next encoded frame in the compressed frames queue can be dequeued, decoded, and enqueued in the uncompressed frames queue. When there is jitter or latency in the network that causes a current size of the playback queue to be greater than the target size of the playback queue plus a hysteresis value, then playback speed of the playback queue can be increased to shrink the size of the playback queue. Similarly, if the current size of the playback queue is less than the target size minus the hysteresis value, then playback speed of the playback queue can be decreased to allow the playback queue size to grow. A presentation timestamp of one or more frames in the uncompressed frames queue can be adjusted in accordance with the playback frame rate.

In an aspect, a non-transitory computer readable medium can store executable instructions that, when executed by a processing system having at least one hardware processor, can perform any of the functionality described above.

In yet another aspect, a processing system having at least one hardware processor is coupled to a memory programmed with executable instructions can, when the instructions are executed by the processing system, perform any of the functionality described above.

Some aspects described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

BRIEF DESCRIPTION OF THE DRAWINGS

Aspects of the invention are illustrated by way of example, and not by way of limitation, in the figures of the accompanying drawings in which like reference numerals refer to similar elements.

DETAILED DESCRIPTION

In the following detailed description of aspects, reference is made to the accompanying drawings in which like references indicate similar elements, and in which is shown by way of illustration manners in which specific aspects may be practiced. These aspects are described in sufficient detail to enable those skilled in the art to practice the invention, and it is to be understood that other aspects may be utilized and that logical, mechanical, electrical, functional and other changes may be made without departing from the scope of the present disclosure. The following detailed description is, therefore, not to be taken in a limiting sense, and the scope of the present invention is defined only by the appended claims.

FIGS. 1 through 5 illustrate use cases for the video playback buffer adjustment system. The video playback buffer adjustment system is described in detail, below, with reference to FIG. 6.

Figure 1:
FIG. 1 illustrates an example configuration of devices that can implement video playback buffer adjustment, according to some aspects.

FIG. 1 illustrates an example configuration 100 of devices that can implement video playback buffer adjustment, according to some aspects. A first electronic device 110, e.g. a personal computer, is communicatively coupled to a second electronic device 105, e.g. a tablet or Smartphone. Both devices can operate at video refresh rates (frame rates) of, e.g., up to 120 Hz, and also at 60 Hz, 40 Hz, 30 Hz, and 24 Hz. Such a configuration can support, e.g., Apple® SideCar®, a program that allows one or more applications running on the first electronic device 110 to display application output on the second electronic device 105, and receive input from second electronic device 105, for each of the one or more applications running on the first electronic device 110. Second electronic device 105 receives video frames to display on the second electronic device 105 that are generated on the first electronic device 110. The second electronic device 105 includes a video playback buffer adjustment module 600 that smoothes the presentation of frames on the second electronic device 105, received from the first electronic device 110.

First electronic device 110 is communicatively coupled to second electronic device 105 by, e.g., a high-speed network cable 115 such as Ethernet or USB-C. Alternatively, or in addition, the first electronic device 110 and second electronic device 105 can be communicatively coupled via a high-speed wireless network, such as WiFi. The high-speed communicative coupling enables video generated on the first device 110 to be produced with low latency and low jitter on the second electronic device 105.

The second electronic device 105 can include a video playback buffer adjustment 600 system for smoothing the presentation of the video on the second electronic device 105. Video playback buffer adjustment 600 is described in detail below, with reference to FIG. 6. Briefly, video playback buffer adjustment 600 includes a video playback buffer that has a compressed frames queue and an uncompressed frames queue. The video playback buffer has a playback mode and a target size (measured in time units of content stored in the playback queue). The compressed frames queue stores encoded video frames received from the first electronic device 110, depending upon the playback mode of the playback queue. The uncompressed frames queue stores decoded video frames that are awaiting display to a user on a display of the second electronic device 105. The uncompressed frames queue has a playback frame rate for displaying frames on a display device, e.g. a display of second electronic device 105. The playback mode of the video playback buffer can be immediate, normal, slow, fast, or servo mode. Embodiments of FIG. 1 can be used in immediate playback mode, wherein an encoded video frame received by the second electronic device 105 from the first electronic device 110 is decoded upon receipt, and then the decoded frame is enqueued in the uncompressed frames queue. The decoded frame will stay in the uncompressed frames queue awaiting display on a display device of the second electronic device 105 at a presentation time that is determined by the playback frame rate of the uncompressed frames queue.

Figure 2:
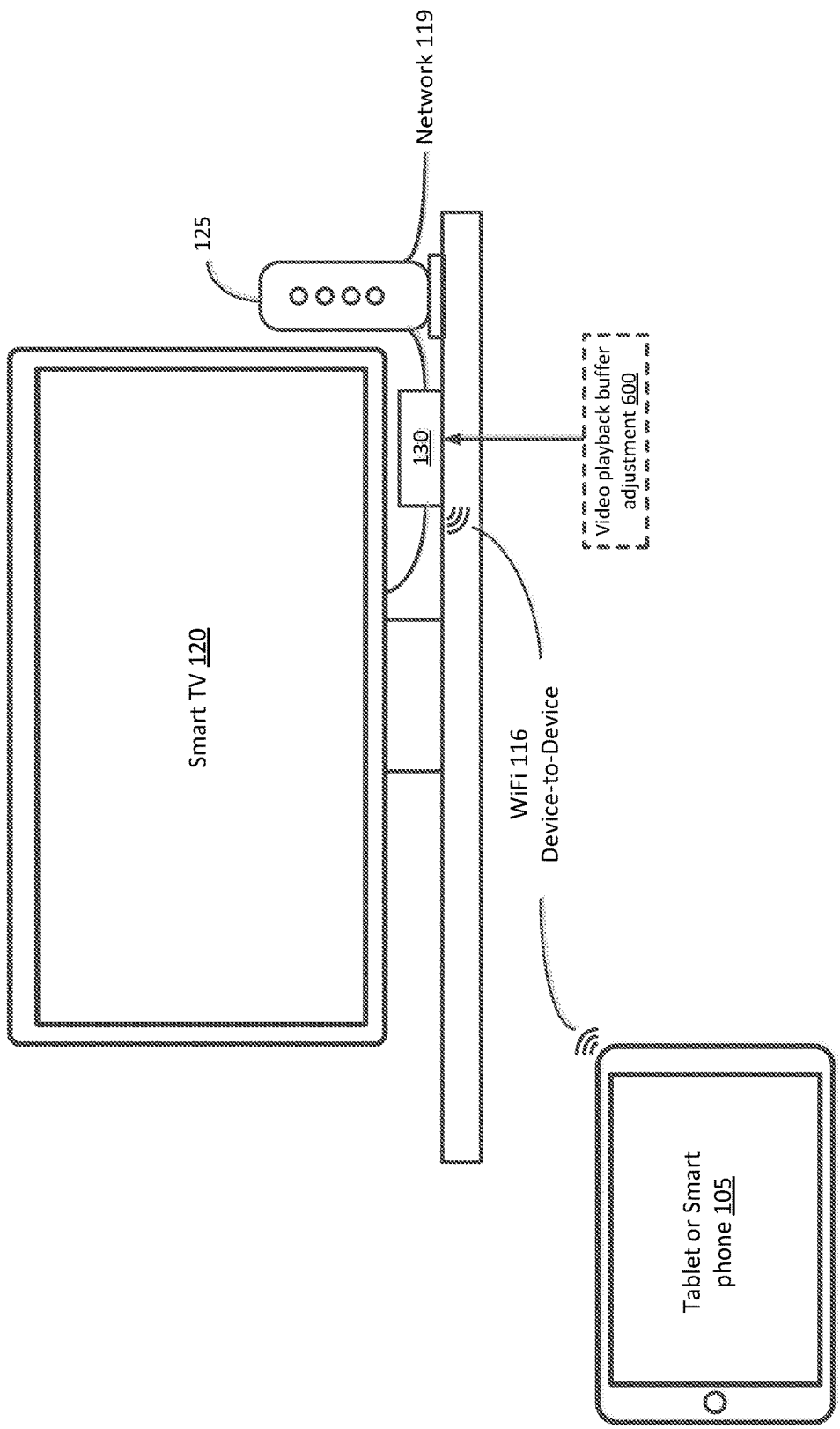
FIG. 2 illustrates an example configuration of devices that can implement video playback buffer adjustment, according to some aspects.

FIG. 2 illustrates an example configuration 200 of devices that can implement video playback buffer adjustment 600, according to some aspects. FIG. 2 illustrates an embodiment that includes a first electronic device, which can be a streaming device 130, such as Apple TV®. Streaming device 130 can receive and display one or more live camera feeds, such as one or more home security cameras, e.g. via Apple® HomeKit®, or Internet "live cams," on a Smart TV 120. Video frames from one or more live cams can arrive at streaming device 130 with network latency and/or jitter. Video playback buffer adjustment 600 can smooth the display of frames received from the one or more live cameras.

A second electronic device 105, e.g. a tablet computer or Smartphone, can be communicatively coupled to the streaming device 130, e.g. by a wireless network such as a WiFi 116 network. The second electronic device 105 can be used to control operation of one or more applications on the streaming device 130 and/or smart TV 120. The streaming device 130 can also be communicatively coupled to a network 119 by, e.g. a cable modem 125. Streaming device 130 can further be communicatively coupled to a display device such as smart TV 120. In an example use case, a one or more home security cameras can be communicatively coupled to streaming device 130, e.g., via a router (not shown). Frames from the one or more home security cameras can be provided to streaming device 130 for display on smart TV 120.

Streaming device 130 can include an embodiment of the video playback buffer adjustment 600. Video playback buffer adjustment 600 is described in detail below, with reference to FIG. 6. Briefly, video playback buffer adjustment 600 includes a video playback buffer that has a playback mode and a target size (measured in time units of content stored in the playback queue). The video playback buffer has a compressed frame queue that can store received encoded video frames, and an uncompressed frames queue that stores frames that have been decoded and are awaiting display. The uncompressed frames queue has an adjustable playback frame rate. Video playback buffer adjustment 600 smoothes the display of video frames received by the streaming device 130 in view of network jitter and/or latency between the camera(s) and the video playback buffer adjustment 600. Video playback buffer adjustment 600 also optimizes a size of the video playback buffer to ensure smooth video playback without growing the video buffer beyond a predetermined target size, plus a small hysteresis value. The hysteresis value is chosen so that video playback buffer adjustment 600 does not change the playback frame rate so frequently as to incur substantial computational overhead. In an embodiment, such as a low latency and/or low jitter embodiment, e.g. for an immediate mode embodiment, the hysteresis value can be 0. If a current size of the playback queue exceeds the target size for the playback queue plus the hysteresis value, then the playback frame rate of uncompressed frames queue can be increased to draw down ("shrink") the size of the playback queue. If the current size of the video playback buffer is less than target size minus the hysteresis value, then the playback frame rate of the uncompressed frames queue can be slowed down to allow the playback queue size to increase ("grow"). For more details of the video playback buffer adjustment 600, see FIG. 6 below.

Figure 3:
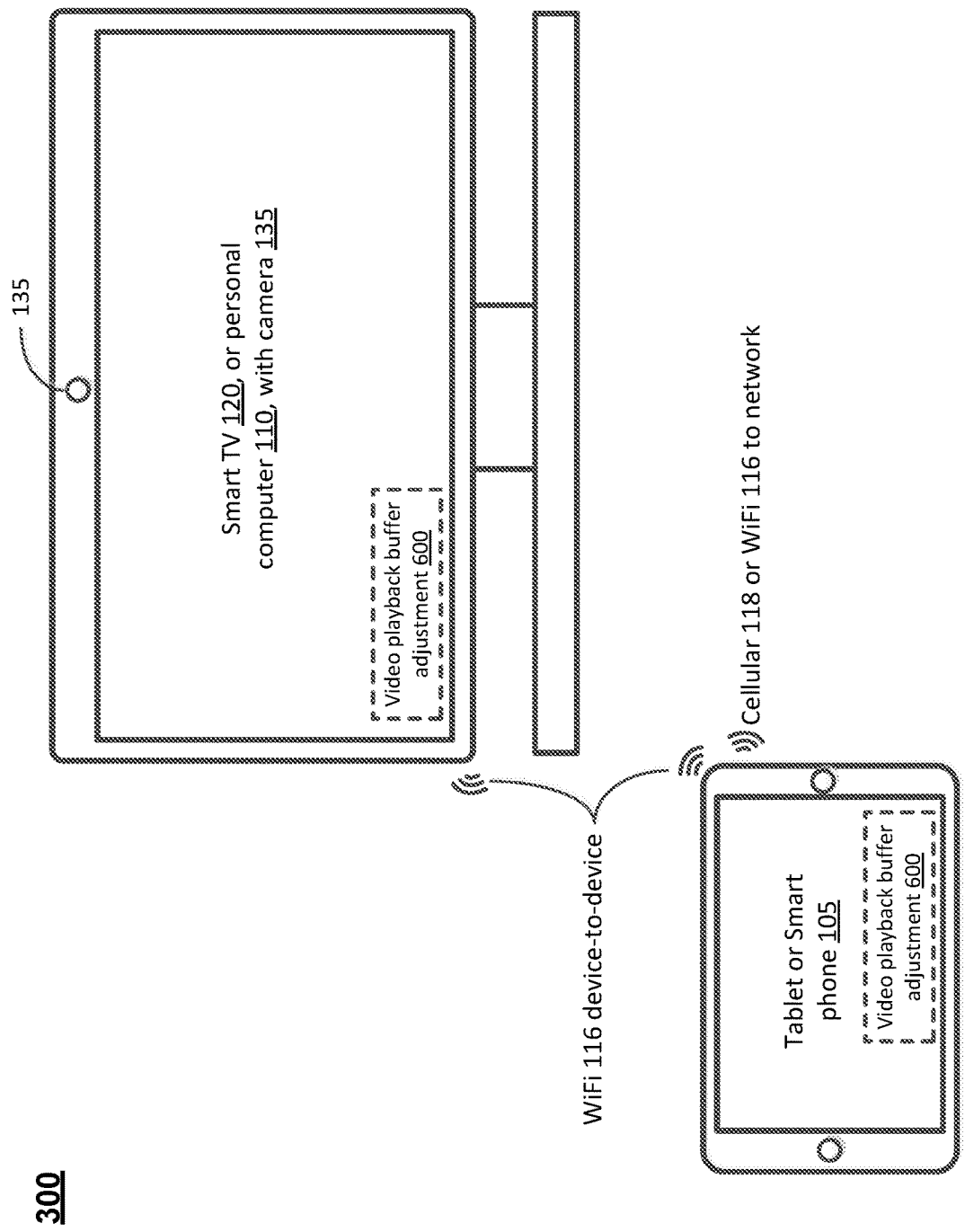
FIG. 3 illustrates an example configuration of devices that can implement video playback buffer adjustment, according to some aspects.

FIG. 3 illustrates an example configuration 300 of devices that can implement video playback buffer adjustment 600, according to some aspects. FIG. 3 illustrates a use case wherein a first electronic device 105, e.g. a tablet computer or Smartphone, displays video on the first electronic device 105 and the same video content is mirrored on the second electronic device, e.g. a smart TV 120 or a personal computer 110. For purposes of FIG. 3, the second electronic device will be referred to as "110," to refer to either a Smart TV or a personal computer. In an embodiment, second electronic device 110 can include a camera 135.

In an example use case, first electronic device 105 can be running a video chat application, such as Apple® FaceTime®, video chatting with a remote, third electronic device (not shown). The first electronic device 105 and second electronic device 110 are configured so that the second electronic device 110 mirrors the display of the first electronic device 105. In an embodiment, the second electronic device 110 can be further configured to use the camera 135 of the second electronic device 110 in the video chat. In this embodiment, video frames captured by camera 135 of second electronic device 110 can be transmitted to first electronic device 105. First electronic device 105, in turn, transmits the video of camera 135, received from the second electronic device 110, to the remote third electronic device (not shown) over a network (not shown).

In the video chat use case, first electronic device 105 can include video playback adjustment buffer (VPBA) 600 to smooth playback on first electronic device 105 of video frames received from remote third electronic device (not shown). The encoded video frames received the remote third electronic device (not shown) can be transmitted by first electronic device 105 to second electronic device 110 in several different manners and times. In an embodiment, first electronic device 105 can transmit a video frame received from the remote third electronic device, to the second electronic device 110, as soon as the video frame is received by the first electronic device 105. Such an embodiment would, essentially, propagate to the second electronic device any network jitter and/or latency due to the network between the first electronic device and the remote third electronic device (not shown). Alternatively, in an embodiment, the first electronic device 105 can enqueue video frames, received from the remote third electronic device, into the compressed frames queue of the VPBA 600 in the first electronic device 105. Then, when the first electronic device 105 dequeues an encoded frame from VPBA 600 in preparation for decoding and equeuing the frame into the decompressed frames queue of the first electronic device 105, the encoded frame could be transmitted to the second electronic device 110. Such an embodiment would reduce the effect of network jitter and/latency due to the network between the first electronic device 105 and the remote third electronic device (not shown) based on the smoothing effect of the video playback buffer adjustment ("VPBA") 600 on the first electronic device 105.

The second electronic device 110 can mirror the display of the first electronic device 105, regardless of which application is running on the first electronic device 105. Such a use case lets the user of the first electronic 105 device share the display of the first electronic device 105 with a larger audience, e.g. on a larger display screen of the second electronic device 110. Unlike the video chat use case, first electronic device 105 need not implement VPBA to mirror the display of the first electronic device 105 on the second electronic device 110. Second electronic device 110 implements VPBA 600. The first electronic device 105 transmits encoded video display frames of the video displayed on first electronic device 105 to the second electronic device 110, e.g. over WiFi 116 in a device-to-device communication, or other network. Second electronic device 110 receives an encoded video frame from first electronic device 105. Second electronic device 110 enqueues the received encoded video frame into the compressed frames queue of the video playback buffer of VPBA 600 on the second electronic device 110. Details of VPBA 600 operation and structure are described below with reference to FIG. 6.

Figure 4:
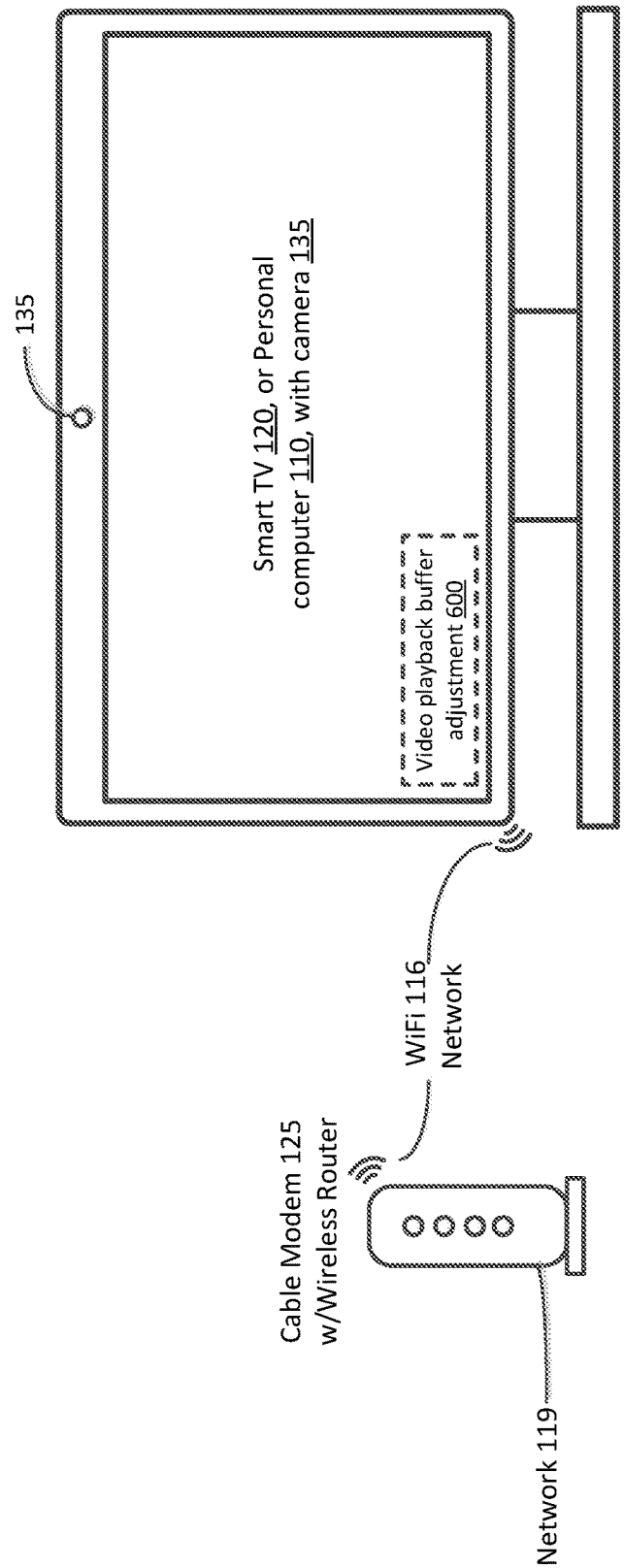
FIG. 4 illustrates an example configuration of devices that can implement video playback buffer adjustment, according to some aspects.

In FIG. 4, video buffer playback adjustment ("VPBA") can be implemented in, e.g., a video chat embodiment wherein the first electronic device 110 or 120 of a first user includes a camera 135. The video chat hardware for the second, remote user is not shown. The first and second electronic devices are communicatively coupled over a network 119. The first electronic device can be a personal computer 110 or a smart TV 120, with a video camera 135. For FIG. 4, the first electronic device will be referred to as "110," which refers to either a personal computer 110, or a smart TV 120 or other such computing device, having a camera 135. First electronic device 110 is communicatively coupled to a network 119. Such coupling can be via a wireless network, e.g. WiFi 116, or a hardwired connection, such as an Ethernet, co-axial cable, USB cable, or fiber optic cable. First electronic device 110 can be coupled to network 119 via, e.g., a cable modem 125, telephony modem, satellite, or other hardware.

Video camera 135 of first electronic device 110 captures video frames of a first user. First electronic device 110 transmits encoded video frames of camera 135 from the first electronic device 110 to the second electronic device (not shown) of the second user. The encoded frames of camera 135 transmitted by first electronic device 110 are independent of VPBA 600. Encoded video frames are received by the first electronic device 110 from the second electronic device (not shown) over network 119. Network 119 is presumed to add some latency and/or jitter in the timing of receipt of encoded video frames from the second electronic device (not shown). When first electronic device 110 receives an encoded video frame from second electronic device (not shown), the encoded video frame is enqueued in the compressed frames queue of the video playback buffer in VPBA 600 on first electronic device 110.

In another use case for FIG. 4, first electronic device 110 can be configured to receive a live feed from a camera, e.g. IP camera, which is transmitting video over the Internet. A user of first electronic device 110 selects the camera, e.g. "a web-cam," for display on first electronic device 110 using an application on first electronic device 110, such as a web browser, e.g. Apple Safari®. An encoded video frame is received from the live feed and is enqueued in the compressed frames queue of VPBA 600 on the first electronic device 110. Further operation of VPBA 600 is described below with reference to FIG. 6.

Figure 5:
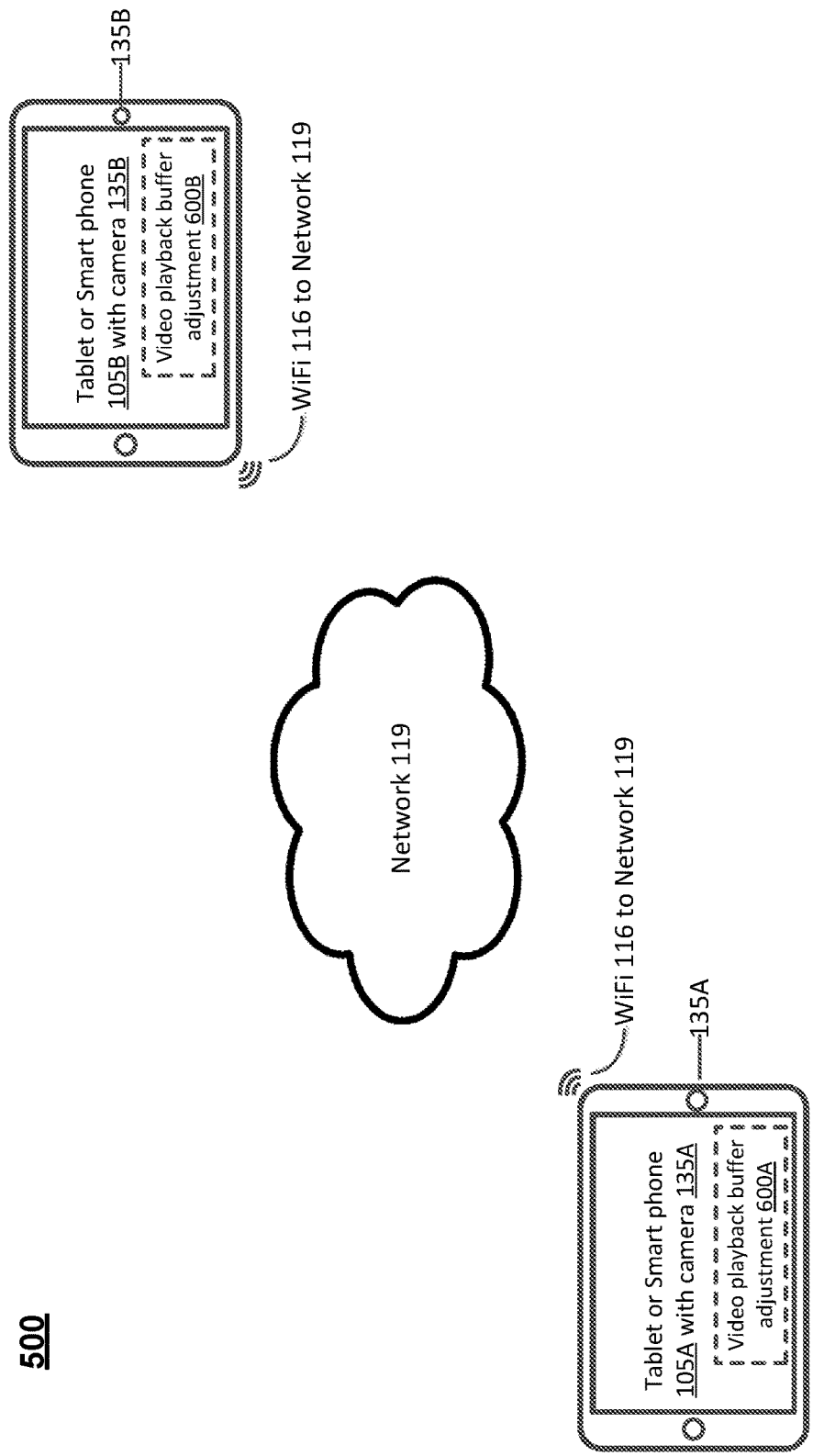
FIG. 5 illustrates an example configuration of devices that can implement video playback buffer adjustment, according to some aspects.

FIG. 5 illustrates an example configuration 500 of devices that can implement video playback buffer adjustment ("VPBA") 600, according to some aspects. FIG. 5 illustrates a use case for a first electronic device 105A having a camera 135A that is communicatively coupled, via a network 119, to a second electronic device 105B having a camera 135B. Either, or both, of devices 105A and 105B can further be coupled to network 119 via, e.g., a wireless network such as WiFi 116, cellular network, or a combination thereof. In a video chat use case, networks 116 and/or 119 can be assumed to introduce substantial jitter and/or latency to video playback. For FIG. 5, networks 116 and 119 will collectively be referred to as network 119.

First electronic device 105A and second electronic device 105B can each implement VPBA 600. First electronic device 105A captures and encodes video frames with camera 135A. The captured and encoded video frames of camera 135A are transmitted over network 119 to second electronic device 105B. Second electronic device 105B receives the encoded video frames from first electronic device 105A. As each encoded video frame is received by second electronic device 105B, the encoded video frame is enqueued in the compressed frames queue of the video playback buffer in VPBA 600B on second electronic device 105B. Similarly, second electronic device 105B captures and encodes video frames with camera 135B. The captured and encoded video frames of camera 135B are transmitted over network 119 to first electronic device 105A. First electronic device 105A receives the encoded video frames from second electronic device 105B. As each encoded video frame is received by first electronic device 105A, the encoded video frame is enqueued in the compressed frames queue of the video playback buffer in VPBA 600A on first electronic device 105A.

Encoded frames enqueued in the compressed frames queue of VPBA 600A on first electronic device 105A are processed as described below with reference to FIG. 6. Similarly, encoded frames enqueued in the compressed frames queue of VPBA 600B on second electronic device 105B are processed as described below with reference to FIG. 6.

Figure 6:
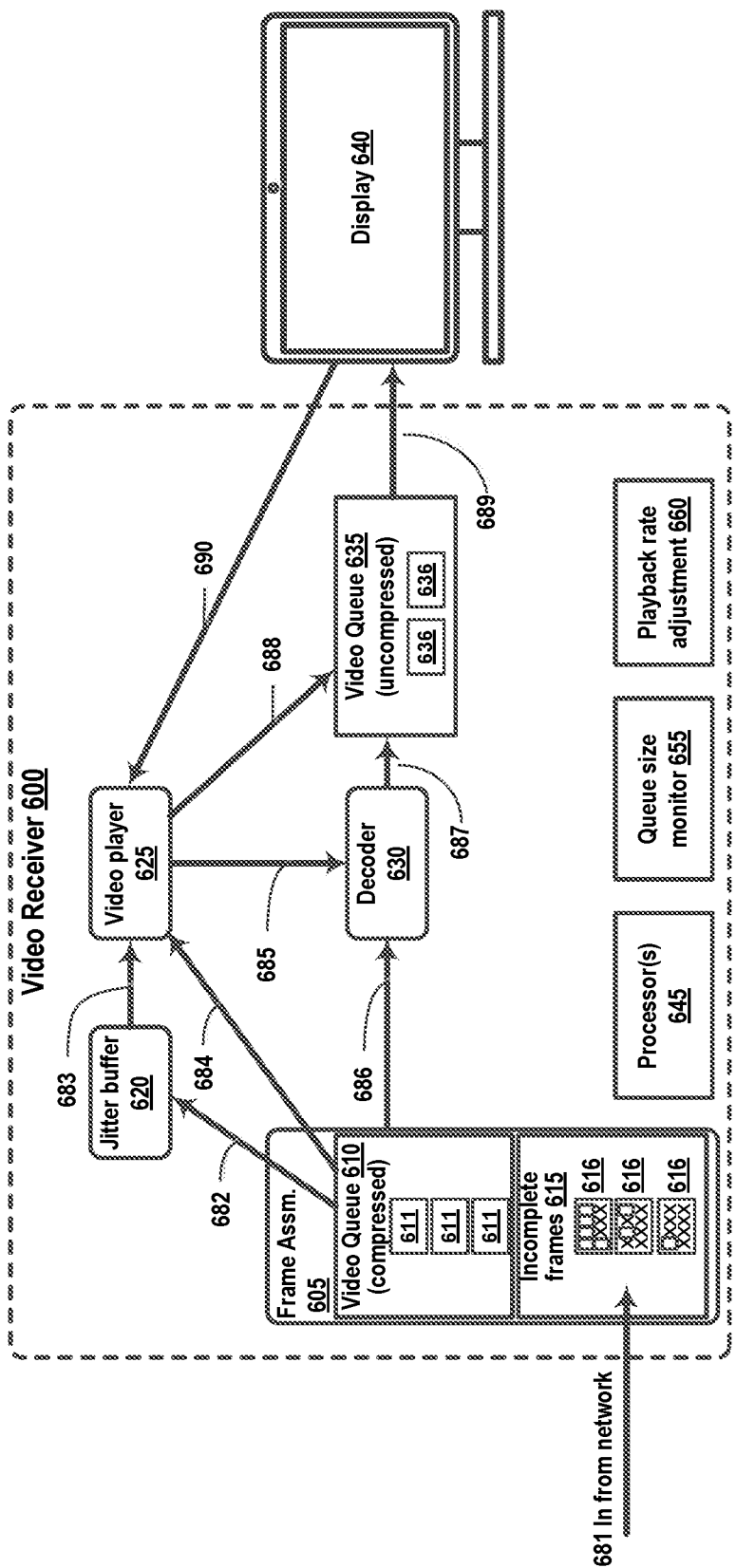
FIG. 6 is a block diagram illustrating a video receiver that implements video playback buffer adjustment, according to some aspects.

FIG. 6 is a block diagram illustrating a video receiver that implements video playback buffer adjustment 600, according to some aspects. Video playback buffer adjustment 600 comprises hardware and logic that implements the functionality described below. For purposes of description, the video receiver 600 and video playback adjustment buffer 600 are substantially the same entity. Video playback buffer adjustment 600 is essentially logic that is implemented on the hardware of the video receiver 600. The logic of video playback buffer adjustment 600 can be implemented in a processing system 645 that comprises memory and at least one hardware processor or a programmable logic device, a queue size monitor 655, and a playback frame rate adjustment system 660, and other components and hardware.

Video receiver 600 comprises a frame assembler 605, a compressed frames queue 610, an incomplete frames storage 615, a jitter buffer 620, a video player 625, one or more decoder(s) 630, and an uncompressed frames queue 635, communicatively coupled to a display 640 that displays uncompressed frames of video to a user. The aforementioned components, and processors 645, queue size monitor 655, and playback frame rate adjustment 660 can be communicatively coupled via a backplane or high-speed bus, integrated into a circuit board, or implemented as one or more integrated circuits. In an embodiment, video receiver 600 can be integrated into a tablet computer, a Smartphone, a smart TV, a personal computer, or other processing device.

In operation 681, frame assembler 605 receives frames 616 from a network, e.g. network 116 or 119, as exemplified in FIGS. 1 through 5. As is known in the art, frames can include complete frames of video, termed "I-frames." I-frames are frames that do not require other video frames to decode the I-frame. Other frames types can include intermediate or partial, frames such as P-frames or B-frames, or portions thereof. P-frames (predictive picture) hold only the change since the image from the previous frame. B-frames (bidirectional predicted picture) use differences between the current fame and both the preceding and following frames to specify content. Frames may also be received out of order. Frame assembler 605 ensures proper order of the frames 616 in the incomplete frames queue 615, and enqueues the ordered frames 611 into compressed frame queue 610. An exception to this process is when the video playback buffer is in immediate mode, for low-latency, low jitter networks, wherein after a frame is received, and in order, and complete, the frame is then decoded and enqueued immediately into the uncompressed frames queue 635 as an uncompressed frame 636.

Jitter buffer 620 detects an amount of jitter in frames that are received. Jitter buffer may add or subtract a small amount of delay to a received frame's presentation time to account for the jitter.

Video player 625 coordinates and tracks playback of video frames through the video playback buffer to the display 640. Communications and signals 682 through 689 are described together, below, still with reference to FIG. 6.

Video playback buffer adjustment (VPBA) 600 receives encoded video frames over a network, such as network 116 or 119 as shown in FIG. 1 through FIG. 5, above. The network, and other elements of the video stream such as encoders and/or decoders, may introduce jitter or latency into the reception of the frames. Packets can be transmitted continuously, in a stream, from one device to another. However, transmission of packets is not instantaneous; there is always some delay. Delay is termed latency of transmission of the packets. In most video streams, latency is not a constant; instead, latency varies. Variance in latency is termed jitter. Latency and jitter may be so small as to be almost imperceptible. In such case, the VPBA 600 can be operated in an "immediate" mode wherein encoded packets that are received by the VPBA 600 are decoded immediately by decoder 630 and enqueued in the uncompressed frames queue 635 as uncompressed frames 636, where they will wait their turn to be displayed on display 640. However, video frames presented to a user over a network most often have jitter and latency that are perceivable to the human eye. The VPBA 600 smoothes playback of the received frames by adjusting a playback frame rate of frames in the uncompressed frames queue, before display of the frames to the display 640. The functionality of the components of the VPBA 600 is as follows.

VPBA 600 includes a video playback buffer that is composed of two queues: compressed frames queue 610 and an uncompressed frames queue 635. Video frames 611 in the compressed frames queue 635 are encoded. Video encodings can include, e.g., H.264, HEVC, MP4, 3GP, OGG, WMV, AVI, QuickTime®, and the like. Video Frames 636 in the uncompressed frames queue 635 have been decoded by decoder 630 and are ready to be presented to display 640 at an appropriate time. Uncompressed frames 636 each have a presentation time stamp that indicates a time at which the decoded frame should be displayed. Dequeuing of a decoded frame 636 from the uncompressed frames queue 635 can happen at the presentation time, and the decoded frame 636 can be actually presented to the display 640 at a hardware synchronization time, such as a vertical synchronization signal of the display 640.

The video playback buffer is composed of the compressed frames queue 610 and the uncompressed frames queue 635. The video playback buffer has a target size, measured in units of time of video content. Selecting a target size for the video playback buffer is described in related U.S. Patent Application No. 63/041,663, filed on Jun. 19, 2020, to Luciano M. Verger, entitled "Real-time Video Jitter Estimation." When the size of the video playback buffer exceeds the target size, plus a small hysteresis value, Δ, then a playback frame rate of the uncompressed video queue 635 is increased to draw down ("shrink") the uncompressed frames queue 635. As decoded frames 636 are dequeued form the uncompressed frames queue 635 and displayed, encoded frames 611 are dequeued from compressed frames queue 610, decoded by decoder 630, and the decoded frames 636 are enqueued into the uncompressed frames queue 635. Thus, speeding up the playback of the decoded frames 636 in the uncompressed frames queue 635 also shrinks both the compressed and uncompressed frames queues, thereby shrinking the entire video playback buffer. Similarly, if the size of the video playback buffer falls below the target size, minus the hysteresis value, Δ, then the playback frame rate of the uncompressed frames queue 635 can be slowed down to grow the size of the video playback buffer. The hysteresis value, Δ, is chosen to reduce the rate at which the VPBA 600 toggles in and/or out of fast mode, normal mode, and slow mode of playback. For example, A may be in the range of 50 ms to 100 ms of video content in the video playback buffer.

The video playback buffer has five modes of operation: immediate mode, normal mode, slow playback mode, fast playback mode, and servo playback mode. Normal mode represents a playback frame rate that is determined by a frame capture rate of the source video frames that are entering the VPBA 600, and a frame rate that the display 640 is cable of reproducing. For example, the video capture rate of a commercial Internet Protocol (IP) camera may be 30 frames per second ("fps"). The display 640 may be capable of displaying any of the refresh rates 24, 30, 40, 60, 120, and 240 fps. Depending upon a number of factors, such as processing resources of the electronic device implementing the VPBA 600, network jitter, and video source capture rate, video player 625 may determine an appropriate playback frame rate for the uncompressed frames queue 635 which is deemed the "normal" playback frame rate.

Immediate mode is used when latency and jitter are nearly imperceptibly low to the human eye. Video playback buffer is configured for immediate mode in embodiments wherein an electronic device that implements the VPBA 600 is connected to a source for video frames and a network that is very low latency and/or jitter. Low latency and low jitter are defined as being latency or jitter values that are minimally perceptible by the human eye, in view of the determined normal mode frame rate of the display device 640 that presents video frames to the user. Slow playback mode is any playback mode that is slower than normal playback mode, such as may be used when the VPBA 600 is trying to growing the video playback buffer to the target size, plus hysteresis value. In slow playback mode, the playback frame rate of the uncompressed frames queue 635 is held at a determined frame rate until the target size of the video playback buffer is restored to the target size, and the playback frame rate of the uncompressed frames queue is restored to normal mode playback frame rate. Fast mode is any playback mode that is faster than normal mode, such as when the VPBA 600 is trying to shrink the video playback buffer to the target size, minus the hysteresis value. In fast playback mode, the playback frame rate of the uncompressed frames queue 635 is held at a determined frame rate until the target size of the video playback buffer is restored to the target size, and the playback frame rate of the uncompressed frames queue 635 is restored to normal mode playback frame rate. In servo playback frame rate mode, the playback frame rate of the uncompressed frames queue 635 is allowed to increase or decrease between two predetermined playback frame rates, e.g. a maximum fast playback frame rate and a minimum slow playback frame rate, in response to the target size of the video playback buffer being larger than the target size plus Δ or smaller than target size minus Δ. Servo mode enables a smooth transition between playback frame rates of a predetermined range. Fallback positions for the different modes can include dropping a frame from display; dropping a decoded frame 636 from the uncompressed frames queue 635; dropping all predicted frames up to an I-frame 611 from the compressed frames queue 610; flushing the partial frames 611 in the compressed frames queue 610 after dropping all frames (including I-frames) from the compressed frames queue 610; requesting a new I-frame from the source of frames; or stalling the video display.

Queue size monitor 655 monitors the total size of the video playback buffer by monitoring the size of the compressed frames queue 610 and the uncompressed frames queue 635. The total size of the video playback buffer is monitored for staying within the bounds of: target size−Δ<video playback buffer size<target size+Δ. Uncompressed frames queue 635 also has a minimum size or "low water mark" that is monitored by queue size monitor 655. If the size of the uncompressed frames queue 635 is less than the low water mark, then VPBA 600 immediately dequeues a frame 611 from the compressed frames queue 610, decodes the frame 611 with decoder 630, and enqueues the decoded frame 636 in uncompressed frames queue 635. In an embodiment, uncompressed frames queue 635 can also have a maximum size, or "high water mark," such that if the queue size monitor 655 determines that size of the uncompressed frames queue 635 is greater than the high water mark, the playback frame rate of the uncompressed frames queue 635 is temporarily increased until the size of the uncompressed frames queue 635 is less than the high water mark.

When the playback frame rate of the uncompressed frames queue 635 is changed (increased or decreased), playback frame rate adjustment logic 660 changes a presentation timestamp on each of the frames 636 in the uncompressed frames queue 635 to match the changed playback frame rate.

Logic Flow for the VPBA 600:

In operation 681, an encoded frame is received by the VPBA 600 over a network. Frames may be received out of order. Frames may be I-frames, P-frames, B-frames, or other frame types. These frames 616 are held in the incomplete frames storage 615, then the incomplete frames 616 are enqueued in order into the compressed frames queue 610 as frames 611. An exception to this operation is when the VPBA 600 is operating in immediate mode. In such case, a received encoded frame, assembled by frame assembler 605, is immediately passed to the decoder 630, then the decoded frame is enqueued in the uncompressed frames queue 635.

In operation 682, frame assembler 605 notifies jitter buffer 620 of the reception of one or more new frames. Jitter buffer 620 determines a small jitter adjustment amount of delay to add to, or subtract from, a frame with respect to the received frame time in order to present the frames smoothly.

In operation 683, jitter buffer 620 notifies video player 625 of the jitter adjustment amount.

In operation 684, frame assembler notifies the video player of the receipt of frames 611 in the compressed frames queue 610.

In operation 685, video player 625 notifies the decoder 630 that it is time to request a frame 611 from compressed frames queue 610. In operation 686, compressed frames queue 610 dequeues a frame 611 and passes the frame 611 to decoder 630. In operation 687, decoder 630 enqueues the decoded frame 636 in the uncompressed frames queue 635.

In operation 688, video player 625 notifies uncompressed frames queue 635 to prepare to dequeue a frame 636 from the uncompressed frames queue 635 for presentation to the display 640.

In operation 689, the uncompressed frames queue 635 presents a frame 636 to display 640. In an embodiment, the frame 636 is presented to the display 640 at the next vertical synchronization (vsync) signal of the display 640 that is detected by the uncompressed frame queue 635.

In operation 690, display 640 acknowledges to the video player 625 the presentation of the frame 636 on display 640.

Figure 7:
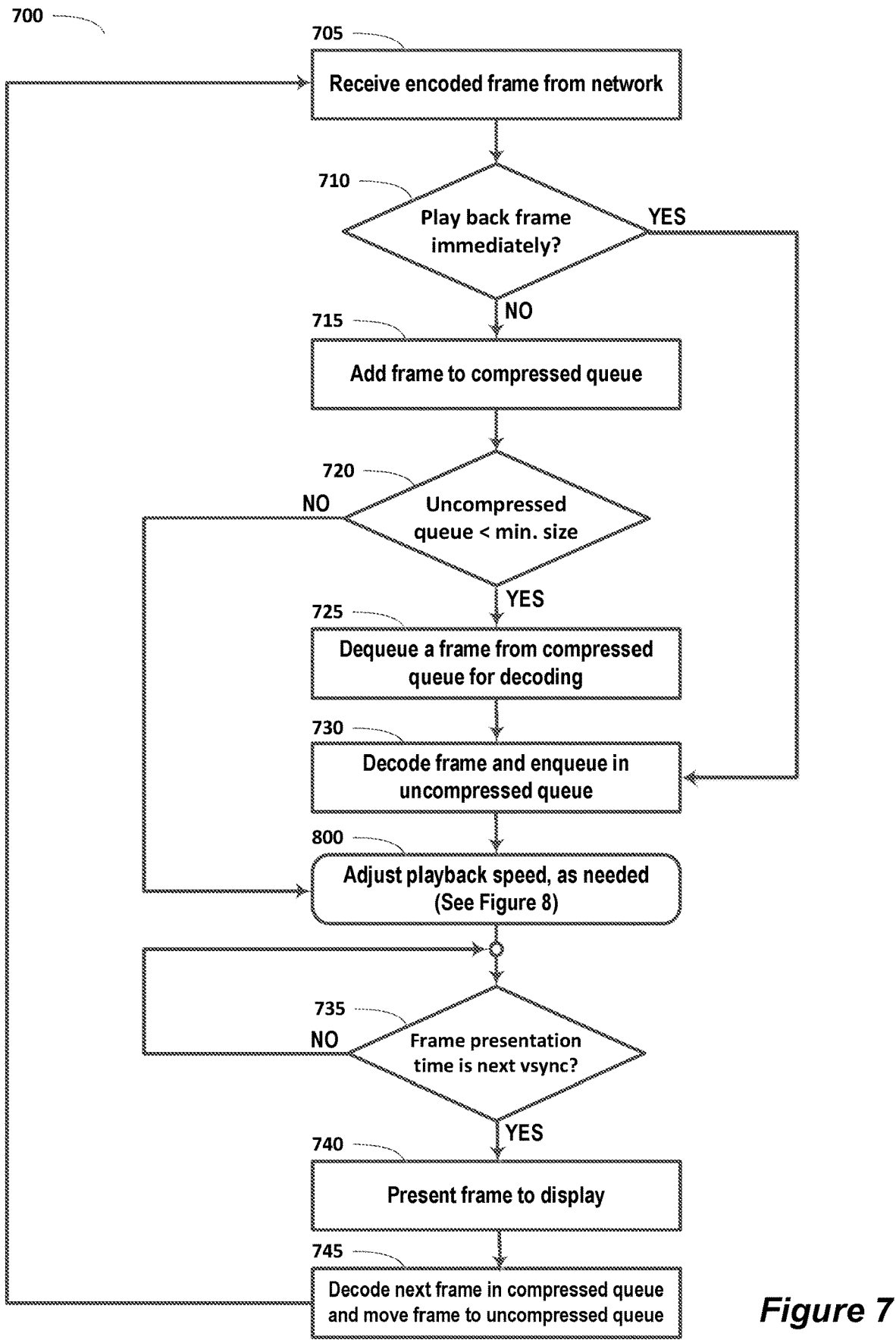
FIG. 7 illustrates a method of processing video frames using video playback buffer adjustment, according to some aspects.

FIG. 7 illustrates a method 700 of processing video frames using video playback buffer adjustment, according to some aspects. Method 700 assumes that the following items have been selected or determined: a target size for the video playback buffer, the low water mark (and optional high water mark) for the uncompressed frames queue, whether the video playback buffer adjustment (VPBA) is to operate in immediate mode or normal mode, and the playback frame rate for the uncompressed frames queue has been determined.

In operation 705, an encoded video frame has been received over a network from a source of video frames. Received frames are encoded according to a video encoding set by the source of video frames. Encoded frames may be incomplete or out of order when initially received. Frame assembler determines an order for the encoded frames such that the following operation 710 is applied to the next-in-order complete encoded frame.

In operation 710, it is determined whether the VPBA is configured to operate in immediate mode. If so, then method 700 continues at operation 730. Otherwise method 700 continues at operation 715.

In operation 715, the received encoded frame is enqueued in the compressed frames queue.

In operation 720, it is determined whether the size of the uncompressed frames queue is less than the minimum allowable size ("low water mark"). Size is measured in units of time of video content. If the size of the uncompressed frames queue is less than the low water mark, then method 700 continues at operation 725. Otherwise method 700 continues at operation 800.

In operation 725, VPBA dequeues an encoded frame from the compressed frames queue.

In operation 730, the encoded frame is decoded and the decoded frame is enqueued in the uncompressed frames queue.

In operation 800, playback speed of the uncompressed frames queue is adjusted, as may be needed. Operation 800 is described in detail, below, with reference to FIG. 8.

In operation 735, it can be determined whether it is time to dequeue a frame from the uncompressed frames queue and display the frame on the display device. The time to display a frame can be determined by monitoring the display for a vertical display synchronization signal. If it is time to display a frame, then method 700 continues at operation 740. Otherwise, method 700 waits at operation 735 for a signal to display a frame.

In operation 740, a frame is dequeued from the uncompressed frames queue and is presented to the display device. In an embodiment, the dequeuing of a frame from the uncompressed frames queue can occur in operation 735, and the dequeued uncompressed frame can be held in a display transfer buffer memory. Then, here, in operation 740 the frame is transferred from the display transfer buffer to the display device.

In operation 745, an encoded frame can be dequeued from the compressed frames queue, the encoded frame can be decoded by the decoder, and the decoded frame can be enqueued in the uncompressed frames queue. Method 745 resumes at operation 705.

Figure 8:
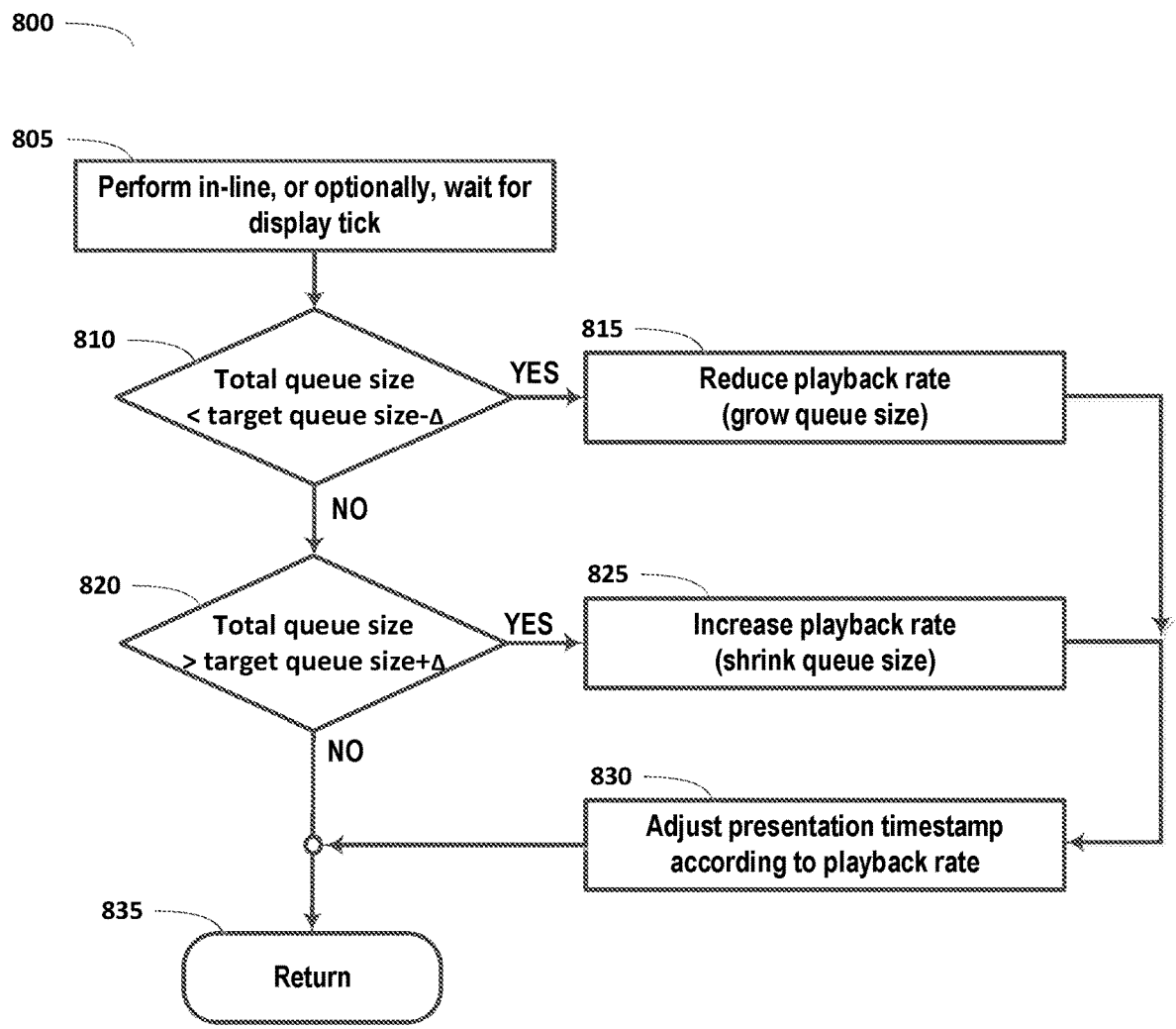
FIG. 8 illustrates a method of adjusting playback frame rate in a video receiver that implements video playback buffer adjustment, according to some aspects.

FIG. 8 illustrates a method 800 of adjusting playback frame rate in a video receiver that implements video playback buffer adjustment, according to some aspects. Method 800 can be called in-line from method 700, as shown in FIG. 7. In an embodiment, methods 700 and 800 can be performed asynchronously.

In operation 805, waits for a display tick from a timer of display operation, such as a refresh timer. Alternatively, the display tick controls operation of method 700, and operation 805 is an in-line entry point from method 700.

In operation 810, it can be determined whether the total size of the video playback buffer (which comprises both the uncompressed frames queue and the compressed frames queue) is less than the predetermined target size for the video playback buffer, minus a hysteresis value, Δ. If so, then method 800 continues at operation 815. Otherwise method 800 continues at operation 820.

In operation 815, it has been determined by operation 810 that the video playback buffer is too small and needs to be grown. A playback frame rate of the uncompressed frames queue can be reduced (slowed) to grow the video playback buffer. Method 800 continues at operation 830.

In operation 820, it can be determined whether the total size of the video playback buffer (which comprises both the uncompressed frames queue and the compressed frames queue) is greater than the predetermined target size for the video playback buffer, plus a hysteresis value, Δ. If so, then method 800 continues at operation 825. Otherwise method 800 continues at operation 835.

In operation 825, it has been determined by operation 820 that the video playback buffer is too large and needs to shrink. A playback frame rate of the uncompressed frames queue can be increased (sped up) to shrink the video playback buffer is less than target size plus Δ. Method continues at operation 830.

In operation 830, the presentation timestamp of decoded frames in the uncompressed frames queue is adjusted according to the reduced playback frame rate in operation 815 or the increased playback frame rate of operation 825. Method 800 continues at operation 835.

In operation 835, method 800 returns to method 700, or ends, if not called from method 700.

Figure 9:
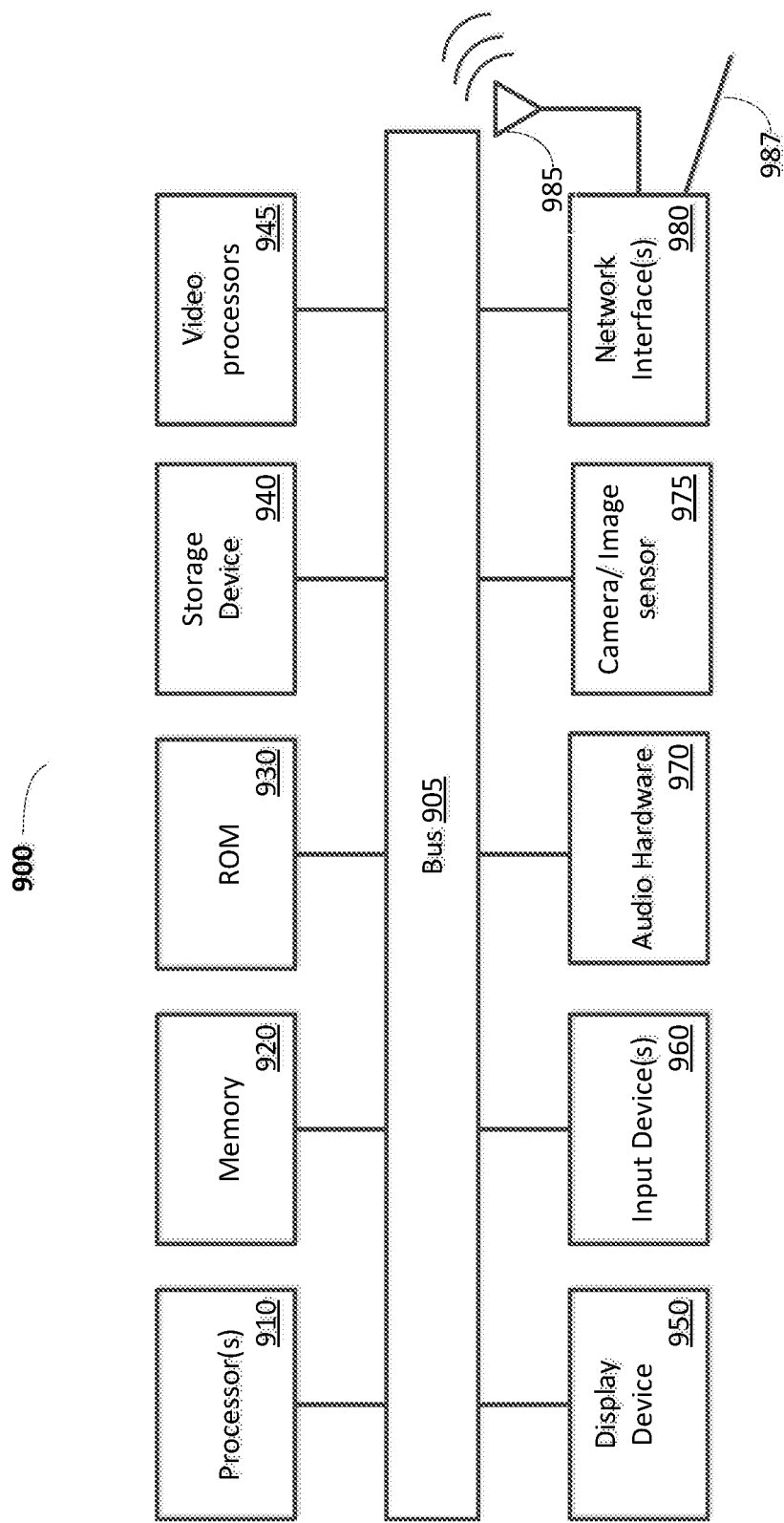
FIG. 9 illustrates, in block form, an exemplary hardware system that can implement the computing systems that incorporate video playback buffer adjustment described herein, according to some aspects.

FIG. 9 illustrates, in block form, an exemplary hardware 900 system that can implement the computing systems that incorporate video playback buffer adjustment described herein, according to some aspects.

The computing system illustrated in FIG. 9 is intended to represent a range of computing systems (either wired or wireless) that support video playback buffer adjustment including, for example, some desktop computer systems, some laptop computer systems, tablet computer systems, cellular telephones, personal digital assistants (PDAs) including cellular-enabled PDAs, set top boxes, Smart TVs, entertainment systems or other consumer electronic devices. Alternative computing systems may include more, fewer and/or different components. The computing system of FIG. 9 may be used to provide the computing devices of FIGS. 1 through 6.

Computing system 900 includes bus 905 or other communication device to communicate information between processor(s) 910, memory 920 and other components coupled to bus 905 that may process information.

While computing system 900 is illustrated with a single processor, computing system 900 may include multiple processors, co-processors, digital signal processors, secure enclave processor(s), field programmable gate arrays (FPGAs) 910 and the like. Computing system 900 further may include random access memory (RAM) or other dynamic storage device 920 (referred to as main memory), coupled to bus 905 and may store information and instructions that may be executed by processor(s) 910. Main memory 920 may also be used to store temporary variables or other intermediate information during execution of instructions by processor 910.

Computing system 900 may also include read only memory (ROM) 930 and/or other static storage device 940 coupled to bus 905 that may store static information and instructions for processor(s) 910. Data storage device 940 may be coupled to bus 905 to store information and instructions. Data storage device 940 can be any type of storage such as flash memory, flash disk, magnetic disk or optical disc and corresponding drive may be coupled to computing system 900. Data storage device 940 can be non-transitory computer-readable medium having executable instructions stored there on that, when executed by a processing system having at least one hardware processor, perform the functionality described herein on an electronic device. Memory 920, ROM 930, and storage device(s) 940 can store executable instructions that implement the video playback buffer adjustment logic, including queue size monitor, playback rate adjustment, jitter buffer logic, frame assembler logic, and other logic to implement video playback buffer adjustment. In an embodiment, video playback buffer adjustment logic can be implemented in a single system on a chip (SOC) or one or more integrated circuits incorporated into a system 900.

Computing system 900 can include one or more video processors 945. Video processors can include one or more video encoders and/or decoders. Video encoding formats can include, e.g. H.264, HEVC, MP4, 3GP, OGG, WMV, AVI, QuickTime®, and the like. Video processors can further include one or more graphics processing units (GPUs) and/or one or more vision processing units (VPUs) that are specifically designed to efficiently processor graphics, such as captured images or video frames.

Computing system 900 may also be coupled, via bus 905, to display device 950, such as liquid crystal display (LCD), light emitting diode (LED) display, or touch screen display that incorporates touch input with the display. Computing system 900 can also include an alphanumeric input device 960, including alphanumeric and other keys, Input devices can further include switches, microphones, touch buttons, fingerprint sensors, infrared scanners, and other biometric inputs, which may be coupled to bus 905 to communicate information and command selections to processor(s) 910.

Computer system 900 may further include audio hardware 970. Audio hardware can include, but is not limited to, one or more amplifiers, one or more speakers, one or more headphone outputs, digital-to-analog converters (DACs), analog-to-digital converters (ADCs), digital signal processor(s), audio encoders and/or decoders, and the like.

Computer system 900 can further include one or more cameras or image sensors 975. A camera can be charge-couple device (CCD) camera, a 3 color CCD (3CCD) camera, an infrared scanning device, or other image capture device.

Computing system 900 may also receive user input from a remote device that is communicatively coupled to computing system 900 via one or more network interfaces 980. Computing system 900 further may include one or more network interface(s) 980 to provide access to a network, such as a local area network. Network interface(s) 980 may include, for example, a wireless network interface having antenna 985, which may represent one or more antenna(e). Computing system 900 can include multiple wireless network interfaces such as a combination of WiFi, Bluetooth® and cellular telephony interfaces. Network interface(s) 980 may also include, for example, a wired network interface to communicate with remote devices via network cable 987, which may be, for example, an Ethernet cable, a coaxial cable, a fiber optic cable, a serial cable, or a parallel cable.

In one aspect, network interface(s) 980 may provide access to a local area network, for example, by conforming to IEEE 802.11 b/g/n and/or IEEE 802.11 ac standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

What is claimed is:

1. A computer-implemented method, comprising:
    configuring a playback queue for a playback mode, a first playback frame rate, and a target size, the playback queue comprising a compressed frames queue and an uncompressed frames queue, the uncompressed frames queue having a minimum threshold size, wherein the target size of the playback queue, and the minimum threshold size of the uncompressed frames queue represent an amount of video frames measured in units of time;
    receiving a video frame in an encoded format;
    in response to determining that the playback queue is configured for immediate playback mode, decoding the encoded video frame and enqueuing the decoded frame in the uncompressed frames queue; and
    presenting the decoded frame to a display device for display to a user.

2. The method of claim 1, further comprising:
    in response to determining that the playback queue is not configured for immediate playback mode, enqueuing the received encoded video frame in the compressed frames queue.

3. The method of claim 2, further comprising:
    in response to determining that a current size of the uncompressed frames queue is less than the minimum threshold size for the uncompressed frames queue:
        dequeuing an encoded frame from the compressed frames queue;
        decoding the encoded frame; and
        enqueuing the decoded frame in the uncompressed frames queue.

4. The method of claim 1, further comprising:
    waiting for a next vertical synchronization signal of the display device to present the decoded frame to the display device.

5. The method of claim 1, further comprising:
    dequeuing an encoded frame from the compressed frames queue;
    decoding the encoded frame from the compressed frames queue;
    and enqueuing the decoded frame in the uncompressed frames queue.

6. The method of claim 1, further comprising:
    in response to determining that a current size of the playback queue is less than the target size of the playback queue, reducing the first playback frame rate of the playback queue to a second playback frame rate; and
    adjusting a presentation time of one or more decoded frames in the uncompressed frames queue, in accordance with the second playback frame rate.

7. The method of claim 1, further comprising:
    in response to determining that a current size of the playback queue is greater than the target size of the playback queue, increasing the first playback frame rate of the playback queue to a second playback frame rate; and
    adjusting a presentation time of one or more decoded frames in the uncompressed frames queue, in accordance with the second playback frame rate.

8. A non-transitory computer-readable storage medium having executable instructions stored there on that, when executed by a processing system having at least one hardware processor, cause the processing system to perform operations comprising:
    configuring a playback queue for a playback mode, a first playback frame rate, and a target size, the playback queue comprising a compressed frames queue and an uncompressed frames queue, the uncompressed frames queue having a minimum threshold size, wherein the target size of the playback queue, and the minimum threshold size of the uncompressed frames queue represent an amount of video frames measured in units of time;
    receiving a video frame in an encoded format;
    in response to determining that the playback queue is configured for immediate playback mode, decoding the encoded video frame and enqueuing the decoded frame in the uncompressed frames queue; and
    presenting the decoded frame to a display device for display to a user.

9. The medium of claim 8, the operations further comprising:
    in response to determining that the playback queue is not configured for immediate playback mode, enqueuing the received encoded video frame in the compressed frames queue.

10. The medium of claim 9, the operations further comprising:
    in response to determining that a current size of the uncompressed frames queue is less than the minimum threshold size for the uncompressed frames queue:
        dequeuing an encoded frame from the compressed frames queue;
        decoding the encoded frame; and
        enqueuing the decoded frame in the uncompressed frames queue.

11. The medium of claim 8, the operations further comprising:
    waiting for a next vertical synchronization signal of the display device to present the decoded frame to the display device.

12. The medium of claim 8, the operations further comprising:
    dequeuing an encoded frame from the compressed frames queue;
    decoding the encoded frame from the compressed frames queue;
    and enqueuing the decoded frame in the uncompressed frames queue.

13. The medium of claim 8, the operations further comprising:
    in response to determining that a current size of the playback queue is less than the target size of the playback queue, reducing the first playback frame rate of the playback queue to a second playback frame rate; and adjusting a presentation time of one or more decoded frames in the uncompressed frames queue, in accordance with the second playback frame rate.

14. The medium of claim 8, the operations further comprising:

in response to determining that a current size of the playback queue is greater than the target size of the playback queue, increasing the first playback frame rate of the playback queue to a second playback frame rate; and adjusting a presentation time of one or more decoded frames in the uncompressed frames queue, in accordance with the second playback frame rate.

15. An electronic device comprising a memory programmed with executable instructions that, when executed by a processing system having at least one hardware processor, cause the processing system to perform operations comprising:

configuring a playback queue for a playback mode, a first playback frame rate, and a target size, the playback queue comprising a compressed frames queue and an uncompressed frames queue, the uncompressed frames queue having a minimum threshold size, wherein the target size of the playback queue, and the minimum threshold size of the uncompressed frames queue represent an amount of video frames measured in units of time;

receiving a video frame in an encoded format;

in response to determining that the playback queue is configured for immediate playback mode, decoding the encoded video frame and enqueuing the decoded frame in the uncompressed frames queue; and presenting the decoded frame to a display device for display to a user.

16. The device of claim 15, the operations further comprising:

in response to determining that the playback queue is not configured for immediate playback mode, enqueuing the received encoded video frame in the compressed frames queue.

17. The device of claim 16, the operations further comprising:

in response to determining that a current size of the uncompressed frames queue is less than the minimum threshold size for the uncompressed frames queue:
dequeuing an encoded frame from the compressed frames queue;
decoding the encoded frame; and
enqueuing the decoded frame in the uncompressed frames queue.

18. The device of claim 15, the operations further comprising:

waiting for a next vertical synchronization signal of the display device to present the decoded frame to the display device.

19. The device of claim 15, the operations further comprising:

dequeuing an encoded frame from the compressed frames queue;
decoding the encoded frame from the compressed frames queue;
and enqueuing the decoded frame in the uncompressed frames queue.

20. The device of claim 15, the operations further comprising:

in response to determining that a current size of the playback queue is less than the target size of the playback queue, reducing the first playback frame rate of the playback queue to a second playback frame rate; and adjusting a presentation time of one or more decoded frames in the uncompressed frames queue, in accordance with the second playback frame rate.

21. The device of claim 15, the operations further comprising:

in response to determining that a current size of the playback queue is greater than the target size of the playback queue, increasing the first playback frame rate of the playback queue to a second playback frame rate; and adjusting a presentation time of one or more decoded frames in the uncompressed frames queue, in accordance with the second playback frame rate.

* * * * *